Patented Sept. 7, 1937

2,092,055

UNITED STATES PATENT OFFICE 2,092,055

MANUFACTURE OF ARTIFICIAL MATERIALS

Henry Dreyfus, London, England

No Drawing. Application November 30, 1934, Serial No. 755,420. In Great Britain December 14, 1933

7 Claims. (Cl. 8—20)

This invention relates to improvements in the manufacture of artificial filaments, threads, yarns, foils and similar materials containing organic derivatives of cellulose, and particularly to processes wherein the artificial materials are subjected to stretching operations.

Processes are already known wherein artificial filaments and other materials containing organic derivatives of cellulose are subjected to stretching operations in order to improve their tensile strength, resistance to delustring, or other properties. Thus in U. S. Patent No. 1,709,470 there are described processes wherein artificial filaments are subjected to a stretching operation beyond their elastic limit and are thus rendered resistant to the delustring action of hot aqueous media, and U. S. application S. No. 378,684 filed July 16, 1929, describes the treatment of filaments or threads containing cellulose acetate or other organic derivatives of cellulose which comprises subjecting them to a stretching operation during their travel from one point to another.

I have now discovered that organic basic compounds, particularly lower aliphatic amines and basic cyclic compounds containing nitrogen in the nucleus, e. g. pyridine, which are relatively volatile, are very valuable agents for use in stretching operations, since such compounds have a rapid penetrating and softening action on the materials, and thus very quickly bring them into a suitable condition for stretching. Organic bases have a saponifying action on cellulose acetate and other organic derivatives of cellulose. The softening action which they exert upon the materials, however, takes effect before any saponification or at least any substantial saponification occurs, and in carrying out the process of the present invention the conditions of treatment are controlled so that stretching is effected and the saponifying agent is removed or its action neutralized, for example by reducing its temperature, before any saponification or any undesired degree of saponification results.

According to the present invention, therefore, artificial filaments, threads, yarns, ribbons, foils and similar products containing cellulose acetate or other organic derivative of cellulose are softened by means of media containing organic bases, particularly lower aliphatic amines and basic cyclic compounds containing nitrogen in the nucleus, and subjected to a stretching operation.

Examples of organic bases which are particularly suitable are mono-, di- and tri-methyl-amines and ethylamines, piperidine and pyridine. Diamines, such as ethylene diamine, mono- and di-methyl ethylene diamine and propylene diamine, and 1.2.3-triamino-propane may also be used for the purposes of the present invention. Other organic basic compounds, for example quinoline and aniline, may be employed. The compounds may also contain other groupings, particularly groupings which tend to increase their solubility in aqueous or alcoholic media such as, for example, hydroxy groups. Thus, ethanol-amines and other alkylolamines may be employed and also other hydroxy amino compounds, for example $\alpha.\gamma$-diamino-$\beta$-hydroxy propane. Urea and substituted ureas, e. g. diethyl urea, tetraphenyl urea, thiourea and guanidine may also be employed, though preferably solutions of normally gaseous or liquid substances are used.

As is stated above, the conditions of treatment according to the present invention will be such that the saponifying action, if any, of the basic compounds is inhibited by removal of the compounds or otherwise before it has taken effect to any undesired degree. Thus the saponifying action may be prevented or reduced by carrying out the stretching operation at low temperatures or with dilute solutions or by allowing the base to act only for a short time. While, in general, it is preferable that treatment with the softening agents of the present invention should be carried out at normal temperatures or less, the processes may, if desired, be effected at higher temperatures, e. g. up to 40°–60° C. or even more, and in such cases the softening period and/or concentration may, of course, be reduced.

The softening agents of the present invention are preferably applied to the artificial materials in aqueous or aqueous alcoholic media, though the invention is not limited thereto and other suitable media, e. g. hydrocarbons, may, if desired, be employed. Moreover, while bath treatments are, in general, the best methods of treating the artificial materials with the softening agents of the present invention, other methods may, if desired, be employed, for example the materials may be sprayed with the softening agent or passed over wicks, rollers or other surfaces which carry the agent.

The materials may be softened in the form of hanks or other packages and subjected to a stretching operation in this form, but, in general, the best method of carrying out the process of the present invention is to soften and stretch the materials during their travel from one point to another, for example from a wet or dry spinning apparatus to a winding or winding and twisting device, or during their travel from one package to another, for example in a bobbin to bobbin operation, or in a winding operation carried out on materials proceeding from a cheese or cake. In the case of foils, films and similar products, stretching may be longitudinal or transverse, or may be both longitudinal and transverse, and in the latter case the longitudinal and transverse stretches may be applied simultaneously or in succession. The stretching operation, particularly when applied to artificial filaments and the like, may be carried out in stages, e. g. by passing the materials in substantially non-slipping contact with a series of rollers rotating at successively increasing peripheral speeds, and if desired "rest" periods may be inserted between the stretching stages, e. g. by contacting the materials with one or more pairs of rollers the peripheral speeds of the rollers in each pair being the same. Further, in the case of artificial filaments and the like considerable advantages, particularly in respect of the production of materials of uniform properties, may be attained by softening and stretching a number of the materials simultaneously in "warp" formation, i. e. in parallel alignment in the form of a sheet.

One method of carrying out the process of the present invention comprises uniformly impregnating the materials with the base under such conditions that the base has substantially no softening action upon them, and then subjecting the impregnated materials for a short period of time to conditions such that the softening action of the base is increased to such an extent that the desired degree of stretching can be effected. Thus, artificial filaments may be passed through a bath containing a solution of a suitable organic base at a temperature such that it has substantially no softening action upon the materials, and they may then be passed rapidly through a heated chamber to bring the softening action of the base into effect and simultaneously stretched. After stretching the base may be removed by washing the materials with a suitable solvent for the base. Preferably the diluent employed in making up the solution of the organic base is more volatile or at least not substantially less volatile under the stretching conditions than the organic base itself, so that the concentration of the base on the materials during stretching tends to increase or at least does not substantially decrease. Suitable diluents which may be employed are water, benzene, toluene, ethyl ether and other ethers and relatively volatile petroleum hydrocarbons. The best results according to this method are in general obtained when the organic base and its concentration in the solution in which it is applied are so chosen that during stretching the base is present on the materials in a concentration approaching but slightly less than that at which it is a solvent for the materials under the stretching conditions.

The tension to bring about the stretch may be applied to the artificial materials simultaneously with the application of the softening agent of the present invention, or means may be employed whereby the stretching tension is restricted to the portion of the materials which has reached a sufficiently softened condition. For example, in the case of artificial filaments and similar products, they may be passed round or over a series of rollers or sets of rollers, and softening may be carried out between the first two rollers or sets of rollers, which rotate at the same peripheral speed, and the succeeding rollers or sets of rollers may rotate at increasing peripheral speeds so that the materials are stretched. Again, a single softening treatment may be applied to the materials in order to bring them to the condition which is requisite for stretching, or a series of softening treatments may be applied. In many cases it is advantageous to apply at least two softening treatments, the first treatment being such as to bring the artificial materials to a softened state which is slightly less than that required for the stretching operation, the final softening being completed in the second treatment. Thus, artificial materials may be treated with a solution of an organic base in a concentration slightly less than that required to effect the requisite degree of softening, and then with a solution of the required concentration. A similar result may be obtained by using two solutions of the same concentration but at different temperatures, the temperature of the first solution being a few degrees, for example 5°–10° C. below that of the second solution.

As stated above organic bases which are relatively volatile are particularly suitable for the purposes of the present invention and in such cases in particular, and especially when open baths are employed, it is advantageous to cover the bath with a layer of an oil or other suitable liquid which is immiscible therein, e. g., as is described in U. S. application S. No. 690,122 filed 19th September, 1933.

Stretching of the artificial materials may be effected according to the present invention by, for example, 100 to 200% of the original length of the materials, or by considerably greater amounts. In this manner materials having an improved tenacity may be obtained.

The artificial materials treated according to the present invention may be subjected to shrinking operations to improve their extensibility either prior to or subsequent to the stretching process of the present invention. Suitable shrinking processes are described in U. S. applications S. Nos. 611,240 filed 13th May, 1932, and 672,805 filed 25th May, 1933. Shrinking may be carried out either continuously with the process of the present invention or as a separate operation.

While, as stated above, the primary object of the present invention is the stretching of artificial materials in order to increase their tenacity, yet the invention does not exclude a simultaneous saponification when it is desired that such should take place. Simultaneous saponification and stretching by means of the organic bases employed according to the present invention has the advantage that the treatment medium contains only one active agent, and recovery of the agent or the making up of the bath is thus considerably simplified.

The following examples are given in order to illustrate the invention, but it is to be understood that they do not limit it in any way:—

*Example 1*

A large number of cellulose acetate yarns in the form of a warp are passed through a bath consisting of a 50 to 55% aqueous solution of pyridine at 25° to 30° C. and are stretched, for example by 100 to 150% of their original length.

*Example 2*

A large number of cellulose acetate yarns are stretched in a manner similar to that described in Example 1, except that a 50 to 60% aqueous solution of piperidine at 20° to 25° C. is employed

Example 3

A large number of cellulose acetate yarns are stretched in a manner similar to that described in Example 1, except that a 40-45% aqueous solution of trimethylamine at 25-30° C. is employed.

Example 4

A large number of cellulose acetate yarns in the form of a warp are passed through a bath consisting of 30% ethyl ether, 35% water and 35% pyridine, the length of the bath and the rate of travel of the yarns being such that on issuing from the bath the yarns are uniformly impregnated with the solution. They are then immediately passed through a chamber heated to a temperature of about 30° C. and are stretched, for example, by 100 to 200% or more of the original length. A current of air is passed through the chamber to assist in the evaporation of the ether from the yarns. On issuing from the chamber they are washed, dried and wound.

The invention is of particular value in the case of artificial materials containing cellulose acetate, and especially cellulose acetate having an acetyl content of from 50 to 54 up to 56 or 58% calculated as acetic acid. The cellulose acetates employed in the manufacture of the artificial materials may be cellulose acetates of relatively low viscosity, for Example 12 to 15 or 20 calculated on the basis of a 6% solution in acetone compared with glycerine as 100, or they may have considerably higher viscosities, for Example 40, 50 up to 80 to 100 or even more. Cellulose acetates of this character may be obtained by the processes described in U. S. Patent No. 1,708,787. The process of the present invention is also applicable to other organic derivatives of cellulose, for example cellulose propionate, butyrate and nitro-acetate, cellulose laurate, palmitate, benzoate and other esters and mixed esters of cellulose, methyl, ethyl, butyl and benzyl cellulose and other cellulose ethers or mixed ethers, and ethyl cellulose acetate, oxyethyl cellulose acetate and other cellulose ether-esters. Cellulose esters of higher organic acids are relatively resistant to saponification by the organic bases employed according to the present invention, while cellulose ethers are practically unaffected and more drastic softening conditions may therefore be employed, if desired, without causing saponification or undue saponification of the materials.

What I claim and desire to secure by Letters Patent is:—

1. Process for the treatment of artificial filaments, threads, foils, films and similar materials having a basis of cellulose acetate, which comprises softening the materials with a medium containing a lower aliphatic amine and subjecting the softened materials to a stretching operation.

2. Process for the treatment of artificial filaments, threads, foils, films and similar materials having a basis of cellulose acetate, which comprises softening the materials with a medium containing a methylamine and subjecting the softened materials to a stretching operation.

3. Process for the treatment of artificial filaments, threads, foils, films and similar materials having a basis of cellulose acetate, which comprises softening the materials with a medium containing an ethylamine and subjecting the softened materials to a stretching operation.

4. Process for the treatment of artificial filaments, threads, foils, films and similar materials having a basis of organic derivatives of cellulose, which comprises impregnating the artificial materials with a medium containing an organic base which is normally a fluid under such conditions that no substantial softening takes place and then rapidly heating the materials so as to bring them into a sufficiently softened condition for stretching and stretching them.

5. Process in accordance with claim 4 wherein the organic base is a basic cyclic compound which contains nitrogen in the nucleus.

6. Process for the treatment of artificial filaments, threads, foils, films and similar materials having a basis of cellulose acetate, which comprises impregnating the artificial materials with a medium containing a lower aliphatic amine under such conditions that no substantial softening takes place and then rapidly heating the materials so as to bring them into a sufficiently softened condition for stretching and stretching them.

7. Process for the treatment of artificial filaments, threads, foils, films and similar materials having a basis of organic derivatives of cellulose, comprising impregnating the artificial materials with a medium containing an organic base selected from the group consisting of pyridine and piperidine under such conditions that no substantial softening takes place and then rapidly heating the materials so as to bring them into a sufficiently softened condition for stretching and stretching them.

HENRY DREYFUS.